(12) United States Patent
Liou et al.

(10) Patent No.: US 12,315,073 B2
(45) Date of Patent: May 27, 2025

(54) THREE-DIMENSIONAL IMAGE DISPLAY METHOD AND DISPLAY DEVICE WITH THREE-DIMENSIONAL IMAGE DISPLAY FUNCTION

(71) Applicant: Innolux Corporation, Miaoli County (TW)

(72) Inventors: Hao-Yu Liou, Miaoli County (TW); Naoki Sumi, Miaoli County (TW); Wei-Yi Lu, Miaoli County (TW); Ruey-Jer Weng, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 141 days.

(21) Appl. No.: 18/170,533

(22) Filed: Feb. 17, 2023

(65) Prior Publication Data

US 2023/0267674 A1    Aug. 24, 2023

Related U.S. Application Data

(60) Provisional application No. 63/432,057, filed on Dec. 13, 2022, provisional application No. 63/311,454, filed on Feb. 18, 2022.

(30) Foreign Application Priority Data

Jan. 31, 2023    (CN) .......................... 202310047502.9

(51) Int. Cl.
*G06T 15/08*    (2011.01)
*G06F 3/14*    (2006.01)
(Continued)

(52) U.S. Cl.
CPC ................ *G06T 15/08* (2013.01); *G06F 3/14* (2013.01); *G06T 3/40* (2013.01); *G06V 10/242* (2022.01); *G06V 2201/07* (2022.01)

(58) Field of Classification Search
CPC ........... G06T 15/08; G06T 3/40; G06T 7/337; G06T 7/60; G06T 7/14; G06T 7/33;
(Continued)

(56) References Cited

U.S. PATENT DOCUMENTS

| 2016/0314587 | A1* | 10/2016 | Ishikawa | ................ | G16H 50/20 |
| 2018/0089845 | A1* | 3/2018 | Shin | ........................ | G06F 18/22 |
| 2020/0234461 | A1* | 7/2020 | Osumi | ..................... | G06T 7/136 |

FOREIGN PATENT DOCUMENTS

| CN | 103018915 | 4/2013 |
| CN | 105072431 | 11/2015 |

(Continued)

OTHER PUBLICATIONS

Glasses-Free 3D Image Display Device (Year: 2014).*
Method and Apparatus for Image Registration (Year: 2021).*

*Primary Examiner* — Wesner Sajous
(74) *Attorney, Agent, or Firm* — JCIPRNET

(57) ABSTRACT

The invention provides a three-dimensional (3D) image display method and a display device with a 3D image display function. The 3D image display method includes the following. A display device coordinate system is established. First volume data is obtained, and multiple first coordinates of multiple voxels of the first volume data in an absolute space coordinate system are defined. The multiple first coordinates of the multiple voxels of the first volume data are converted to the display device coordinate system to generate second volume data. Display data is generated according to the second volume data. An image is displayed according to the display data through the display device, and the image forms a 3D image with a 3D object image in human eyes, in which the 3D object image changes equally or proportionally in response to a change desired by a user through an input unit.

18 Claims, 13 Drawing Sheets

(51) Int. Cl.
*G06T 3/40* (2024.01)
*G06V 10/24* (2022.01)
*H04N 13/31* (2018.01)

(58) Field of Classification Search
CPC ............. G06T 5/80; G06T 2207/10088; G06T 2207/10081; G06T 2207/10132; G06V 10/242; G06V 2201/07; G06F 3/40; G06F 3/0481; H04N 13/31; H04N 13/351; G02B 30/27; G02B 30/25; G02B 30/32; G02B 27/0093; A61B 5/00
See application file for complete search history.

(56) References Cited

FOREIGN PATENT DOCUMENTS

| EP | 2811746 A1 * | 12/2014 | ......... G02B 27/2214 |
| EP | 3008688 B1 * | 12/2021 | ............... A61B 5/00 |

* cited by examiner

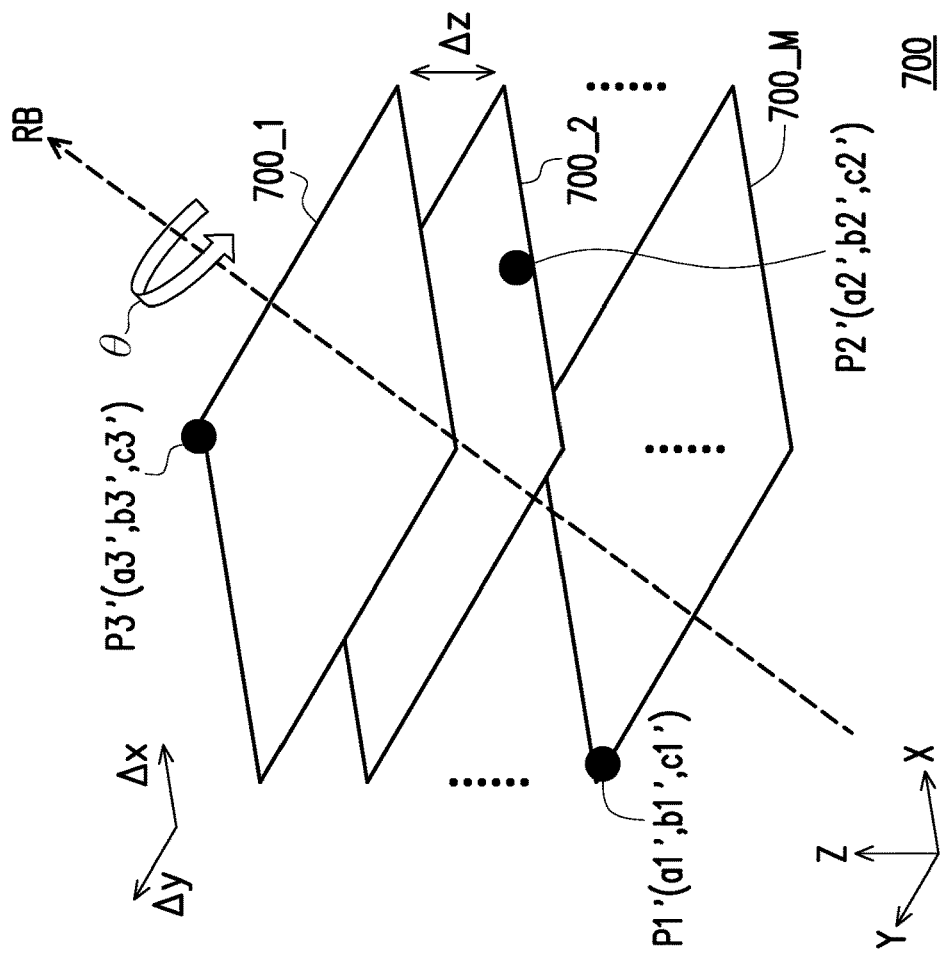
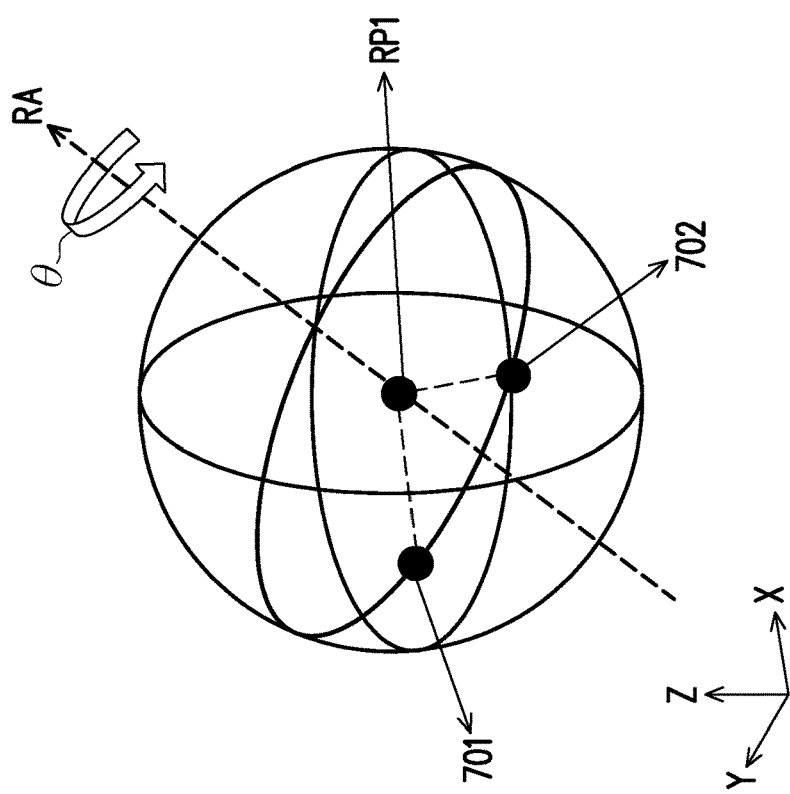
FIG. 7B
FIG. 7A

THREE-DIMENSIONAL IMAGE DISPLAY METHOD AND DISPLAY DEVICE WITH THREE-DIMENSIONAL IMAGE DISPLAY FUNCTION

CROSS-REFERENCE TO RELATED APPLICATION

This application claims the priority benefit of U.S. provisional application Ser. No. 63/311,454, filed on Feb. 18, 2022, U.S. provisional application Ser. No. 63/432,057, filed on Dec. 13, 2022, and China application serial no. 202310047502.9, filed on Jan. 31, 2023. The entirety of each of the above-mentioned patent applications is hereby incorporated by reference herein and made a part of this specification.

BACKGROUND

Technical Field

The disclosure relates to an image display technology, and particularly relates to a display device with a three-dimensional (3D) image display function and a 3D image display method.

Description of Related Art

Most of the traditional medical image display technologies are displayed through a display device, such as a two-dimensional medical image of computed tomography (CT), and complicated operations by medical personnel are required to obtain a scan result of the entire scanned object. Therefore, during a process of performing other behavioral events at the same time, the medical personnel are not able to quickly and instantly obtain required information through the two-dimensional medical image displayed by the display device.

SUMMARY

The disclosure provides a three-dimensional (3D) image display method and a display device with a 3D image display function, which can realize a good 3D image display function.

According to an embodiment of the disclosure, a 3D image display method of the disclosure includes the following. A display device coordinate system is established. First volume data is obtained, and multiple first coordinates of multiple voxels of the first volume data in an absolute space coordinate system are defined. The multiple first coordinates of the multiple voxels of the first volume data are converted to the display device coordinate system to generate second volume data. Display data is generated according to the second volume data. An image is displayed according to the display data through a display device, and the image forms a 3D image with a 3D object image in human eyes. The 3D object image changes equally or proportionally in response to a change desired by a user through an input unit.

According to an embodiment of the disclosure, a display device with a 3D image display function of the disclosure includes a processor and an input unit. The processor is configured to establish a display device coordinate system. The input unit is coupled to the processor. The processor obtains first volume data and defines multiple first coordinates of multiple voxels of the first volume data in an absolute space coordinate system. The processor converts the multiple first coordinates of the multiple voxels of the first volume data to the display device coordinate system to generate second volume data. The processor generates display data according to the second volume data. The display device displays an image according to the display data, and the image forms a 3D image with a 3D object image in human eyes. The 3D object image changes equally or proportionally in response to a change desired by a user through an input unit.

Based on the above, the 3D image display method and the display device with the 3D image display function of the disclosure can display the corresponding image according to the volume data, and the image can form the 3D image with the 3D object image in the human eyes.

The disclosure may be understood by referring to the following detailed description in combination with the accompanying drawings. It should be noted that, in order to make the readers understand easily and for the sake of brevity of the accompanying drawings, several drawings in the disclosure only depict a part of the display device. Also, certain components in the drawings are not drawn to actual scale. In addition, the quantity and size of each component in the drawings are only for illustration, and are not intended to limit the scope of the disclosure.

BRIEF DESCRIPTION OF THE DRAWINGS

FIG. 7A and FIG. 7B are schematic diagrams of rotating volume data according to an embodiment of the disclosure.

DESCRIPTION OF THE EMBODIMENTS

Figure 1:
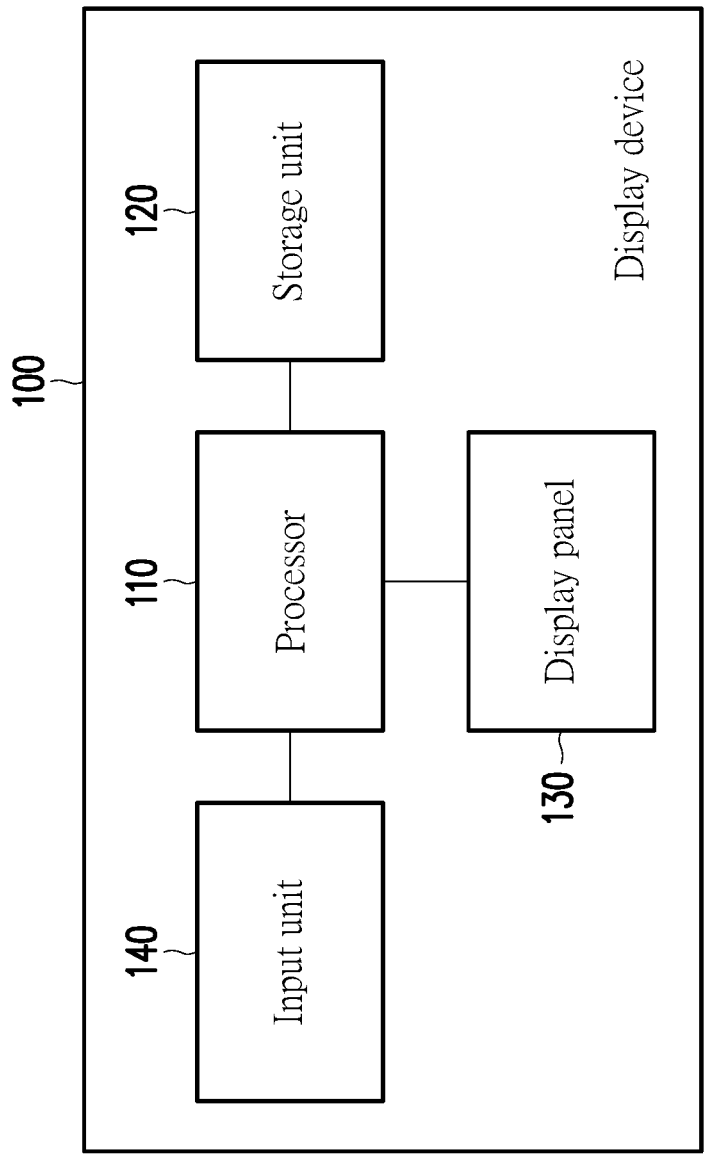
FIG. 1 is a schematic circuit diagram of a display device according to an embodiment of the disclosure.

Reference will now be made in detail to the exemplary embodiments of the disclosure, examples of which are illustrated in the accompanying drawings. Wherever possible, the same reference numbers are used in the drawings and descriptions to refer to the same or like parts.

Certain terms will be used throughout the specification and the appended claims of this disclosure to refer to particular components. Persons skilled in the art should understand that display device manufacturers may refer to the same component by different names. This article does not intend to distinguish between those components that have the same function but have different names. In the following specification and appended claims, words such as "comprising" and "including" are open-ended words, so they should be interpreted as meaning "including but not limited to . . . ".

In some embodiments of the disclosure, terms such as "coupled" and "interconnected" related to joining and connecting, unless otherwise specified, may mean that two structures are in direct contact, or may also mean that two structures are not in direct contact, and there are other structures positioned between these two structures. Also, the terms related to joining and connecting may also include the situation that both structures are movable, or both structures are fixed. In addition, the term "coupled" includes any direct and indirect means of electrical connection.

The ordinal numbers used in the specification and appended claims, such as "first", "second", etc., are used to modify components, which do not imply or represent that the components have any previous ordinal numbers, nor do they mean that a certain component is related to a sequence of another component, or a sequence of the manufacturing method. The use of the multiple ordinal numbers is only used to clearly distinguish the component with a certain name from another component with the same name. The same words may not be used in the appended claims and the specification. Accordingly, a first component in the specification may be a second component in the appended claims. It should be understood that in the following embodiments, without departing from the spirit of the disclosure, technical features in several different embodiments may be replaced, reorganized, and mixed to complete other embodiments.

The display device mentioned in this disclosure may include a virtual reality device, an augmented reality device, a head-up display device, a transparent display device, a sensing device or a splicing device, but is not limited thereto. The display device may be a bendable or flexible electronic device. The display device may be a non-self-illuminating display device or a self-illuminating display device. The sensing device may be a sensing device for sensing capacitance, light, heat or ultrasonic, but not limited thereto. The display device may, for example, include electronic components such as passive components and active components, such as capacitors, resistors, inductors, diodes, transistors, and the like. The diodes may include light emitting diodes or photodiodes. The light emitting diodes may, for example, include inorganic light emitting diodes, organic light emitting diodes (OLED), mini light emitting diodes (mini LEDs), micro light emitting diodes (micro LEDs) or quantum dot light emitting diodes (quantum dot LEDs), but is not limited thereto. The splicing device may be, for example, a display splicing device, but is not limited thereto. It should be noted that the display device may be any permutation and combination of the above, but is not limited thereto.

It should be noted that without departing from the spirit of the disclosure, features in several different embodiments may be replaced, reorganized, and mixed to complete other embodiments.

FIG. 1 is a schematic circuit diagram of a display device according to an embodiment of the disclosure. Referring to FIG. 1, a display device 100 includes a processor 110, a storage unit 120, a display panel 130, and an input unit 140.

The processor 110 is coupled to the storage unit 120, the display panel 130, and the input unit 140. The display device 100 may be a naked-eye three-dimensional (3D) image display device with a 3D image display function. In an embodiment, the processor 110 and the storage unit 120 may also be integrated in an external host device (or a computer device), and the input unit 140 is externally connected to the external host device or integrated in the display device 100. The display panel 130 may be integrated in the display device 100. The external host device and the display device may be connected through wired or wireless (such as bluetooth or WiFi) manner.

In this embodiment, the processor 110 may include, for example, a central processing unit (CPU), a graphic processing unit (GPU), or other programmable general-purpose or special-purpose microprocessor, digital signal processor (DSP), application specific integrated circuit (ASIC), programmable logic device (PLD), other similar processing circuits or a combination of these devices. In this embodiment, the storage unit 120 may include a memory and/or a database. The storage unit 120 may be, for example, a non-volatile memory (NVM). The storage unit 120 may store relevant programs, modules, systems or algorithms for realizing various embodiments of the disclosure, for the processor 110 to access and execute to realize the relevant functions and operations described in the various embodiments of the disclosure.

In this embodiment, the display panel 130 may include, for example, liquid crystal and light emitting diodes. The light emitting diode may, for example, include an organic light emitting diode (OLED), a mini light emitting diode (mini LED), a micro light emitting diode (micro LED) or a quantum dot light emitting diode (quantum dot, QD, which may be, for example, QLED, QDLED), fluorescence, phosphor or other suitable materials and the materials may be arranged and combined arbitrarily, but is not limited thereto.

In this embodiment, the input unit 140 is configured to generate a corresponding control command or adjustment parameter according to an actual operation of a user, so that the processor 110 may obtain real physical adjustment information, and is used to adjust volume data. For example, the input unit 140 generates a command, and after a movement command is imported into the algorithm or processing unit of the processor 110 for processing, the processor 110 exports the control command or adjustment parameter to adjust the volume data, but is not limited thereto. In this embodiment, the input unit 140 may be a mouse, and the user may control the cursor in an operation screen displayed on the display panel 130 through operating the input unit 140, but the disclosure is not limited thereto. In an embodiment, the input unit 140 may also be a spatial dynamic sensing device. The spatial dynamic device includes a visible light charge coupled device (CCD) image sensing element, an infrared light CCD image sensing element, a time of flight (ToF), a structured light sensor, or other suitable materials. The movement command is generated by detecting an optical change of a gesture image of the user, thereby enabling the processor 110 to generate the corresponding control command or adjustment parameter. In an embodiment, the input unit 140 may also be a touch device, or a touch panel, to generate the corresponding control command or adjustment parameter according to the gesture or touch (including the hand of the user or a stylus) of the user. In an embodiment, the input unit 140 may also be an interface on which an operator may directly input the command. It should be noted that, the command generated by the input unit 140 may include the movement command, a rotation command, and a scaling command. The movement command may include a starting point signal, an end point signal, and a moving distance; the rotation command may include a starting point signal, an end point signal, and a rotation angle; and the scaling command may include a scaling proportion, but is not limited to.

Figure 2:
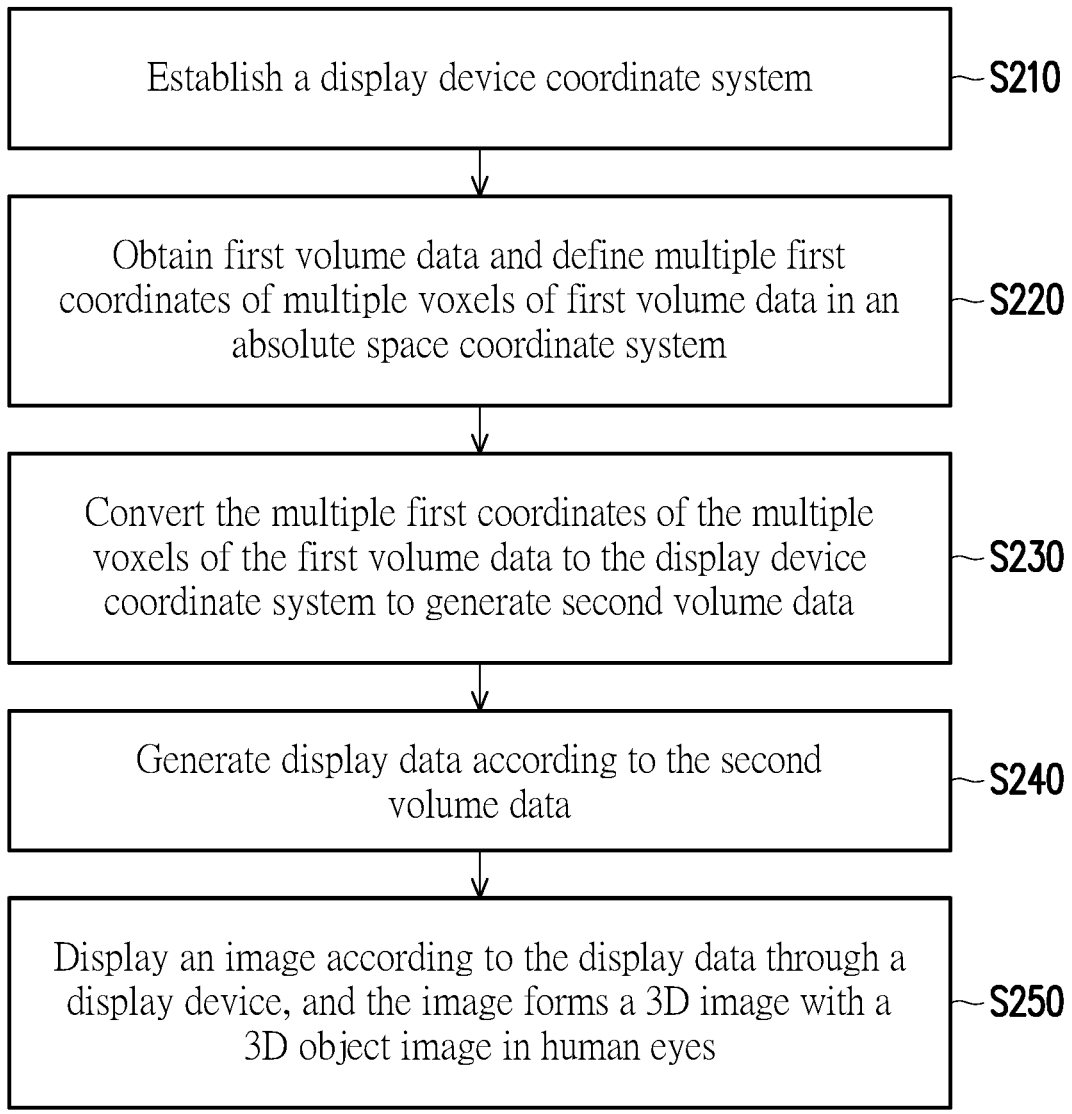
FIG. 2 is a flowchart of a three-dimensional (3D) image display method according to an embodiment of the disclosure.
Figure 3:
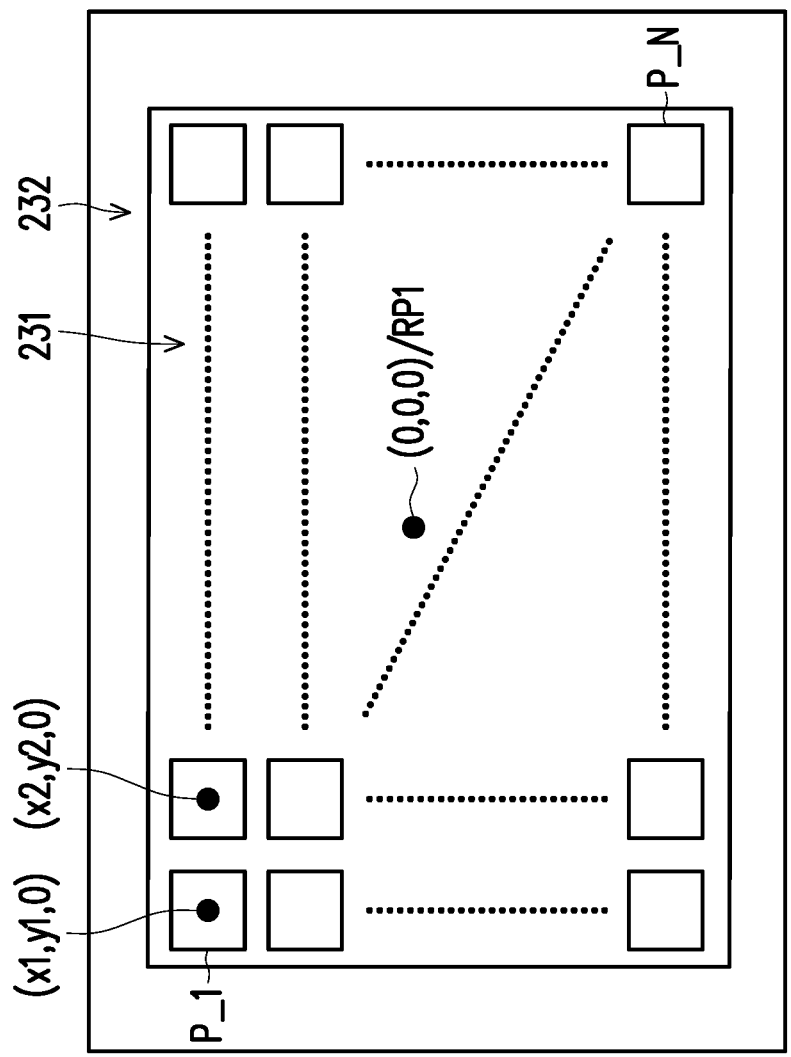
FIG. 3 is a schematic diagram of establishing a display device coordinate system according to an embodiment of the disclosure.
Figure 3:
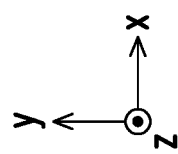

FIG. 2 is a flowchart of a 3D image display method according to an embodiment of the disclosure. Referring to FIG. 1 and FIG. 2, the display device 100 may operate, for example, the following Step S210 to Step S250 to realize a display function of a 3D image. In Step S210, the processor 110 may establish a display device coordinate system. With reference to FIG. 3, FIG. 3 is a schematic diagram of establishing the display device coordinate system according to an embodiment of the disclosure. In this embodiment, the display panel 130 may include an active area (AA) 231 and a peripheral area 232. The display panel 130 may include a pixel array arranged in the AA 231. The pixel array includes multiple pixels P_1 to P_N, and each of the pixels P_1 to P_N may include multiple sub-pixels (such as red sub-pixels, green sub-pixels, and blue sub-pixels), in which N is a positive integer. In this embodiment, the processor 110 may establish a display device coordinate system of the display device 100. The display device coordinate system may be used to describe a 3D space constructed by a first orientation X, a second orientation Y, and a third orientation Z. In this embodiment, the "3D" described in this embodiment may be formed by the first orientation X, the second orientation Y, and the third orientation Z, and the three orientations may form three planes. In detail, the first orientation X, the second orientation Y, and the third orientation Z may be perpendicular to each other; or the first orientation X and the second orientation Y are perpendicular to each other, and the third orientation Z is not perpendicular to the first orientation X or the second orientation Y; or the first orientation X, the second orientation Y, and the third orientation Z are not perpendicular to each other, but the disclosure is not limited thereto. In this embodiment, the processor 110 may define a central point of the display panel 130 as a reference point RP1 with coordinates (0, 0, 0), but the disclosure is not limited thereto. The reference point RP1 may be any point on the display device 100 or any point outside the display device 100. The coordinates of the reference point RP1 may also be arbitrary coordinates. In addition, in this embodiment, the processor 110 may also define coordinates of each of the pixels P_1 to P_N or each sub-pixel of the pixels P_1 to P_N, for example, the pixel P_1 corresponds to coordinates (x1, y1, 0) and the pixel P_2 corresponds to coordinates (x2, y2, 0), and so on.

Figure 4:
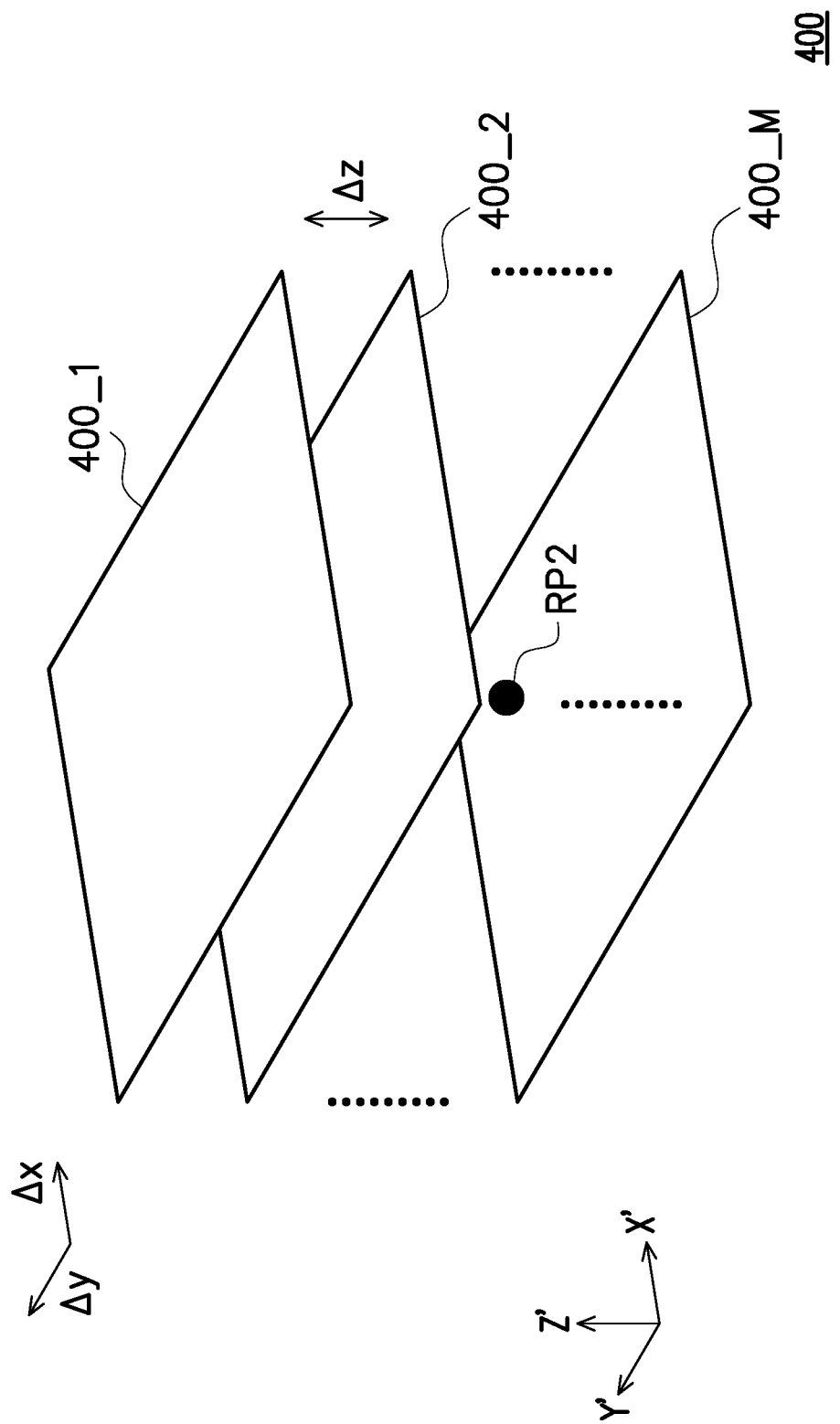
FIG. 4 is a schematic diagram of defining multiple first coordinates of first volume data according to an embodiment of the disclosure.

In Step S220, the processor 110 may obtain first volume data and define multiple first coordinates of multiple voxels of the first volume data in an absolute space coordinate system. With reference to FIG. 4, FIG. 4 is a schematic diagram of defining the multiple first coordinates of the first volume data according to an embodiment of the disclosure. In this embodiment, first volume data 400 may comprise multiple layers of two-dimensional medical image data 400_1 to 400_M, in which M is a positive integer. In an embodiment, the first volume data 400 may also be image data of other application fields, so that the display device 100 may display 3D images of the other application fields. The two-dimensional medical image data may be, for example, a computed tomography (CT) image, a magnetic resonance imaging (MRI) image, or an automated breast ultrasound system (ABUS) image, etc. For this, the processor 110 may first receive multiple layers of two-dimensional medical images corresponding to different heights (continuous heights) externally imported to obtain the first volume data 400. The first volume data 400 may be corresponding data of each voxel of a 3D image established by spatially combining these two-dimensional medical images, but the disclosure is not limited thereto. For example, when the two-dimensional medical images are CT images, the corresponding data of each voxel may be a radiation absorption value; when the two-dimensional medical images are MRI images, the corresponding data of each voxel may be a magnetic resonance signal; when the two-dimensional medical images are ABUS images, the corresponding data of each voxel may be a wave signal, but the disclosure is not limited thereto. In this embodiment, the processor 110 may determine multiple first coordinates of multiple voxels of the first volume data 400 in the absolute space coordinate system according to a first absolute spacing Δx of a first orientation X', a second absolute spacing Δy of a second orientation Y', and a third absolute spacing Δz of a third orientation Z' corresponding to the absolute space coordinate system. In this embodiment, the first absolute spacing Δx, the second absolute spacing Δy, and the third absolute spacing Δz may be the same spacing or different spacings, and may be determined by a detection setting or device characteristics of an detection equipment obtaining the two-dimensional medical image data 400_1 to 400_M. The multiple voxels of the first volume data 400 may construct a 3D object image corresponding to a size of a real object according to the absolute spacing. For example, after a CT scan is performed on a patient, data generated includes a spacing (without absolute coordinates) between data points and the radiation absorption value. It is necessary to establish the absolute space coordinate system through the processor 110 and process the data to generate the 3D image with absolute coordinates in the absolute space coordinate system. In this embodiment, the processor 110 may write information of the first coordinates into each piece of voxel data of the first volume data 400, and each piece of the voxel data also includes corresponding image data. Moreover, the processor 110 may define a set of central coordinates of the first volume data 400 as coordinates of a reference point RP2, but the disclosure is not limited thereto. The coordinates of the reference point RP2 may be positioned at any coordinate position of the first volume data 400, or at any coordinate position outside the first volume data 400. In an embodiment, the processor 110 may determine the multiple first coordinates of the multiple voxels of the first volume data 400 in the absolute space coordinate system according to a first absolute spacing Δx1 of a first orientation X', a second absolute spacing Δy1 of a second orientation Y', and a third absolute spacing Δz1 of a third orientation Z' corresponding to the absolute space coordinate system. In this embodiment, the first absolute spacing Δx1 may have different values in the first orientation according to a function, that is, in the first orientation X', a spacing between a first data point and a second data point and a spacing between a second data point and a third data point change according to the function; the second absolute spacing Δy1 may have different values in the second orientation Y' according to a function, and the third absolute spacing Δz1 may have different values in the third orientation Z' according to a function. For example, data generated after an ultrasound scan is performed on the patient includes a spacing (without absolute coordinates) between each data point and a wave signal. It is necessary to establish the absolute space coordinate system through the processor 110 and process the data to generate a 3D image with absolute coordinates in the absolute space coordinate system.

Figure 5:
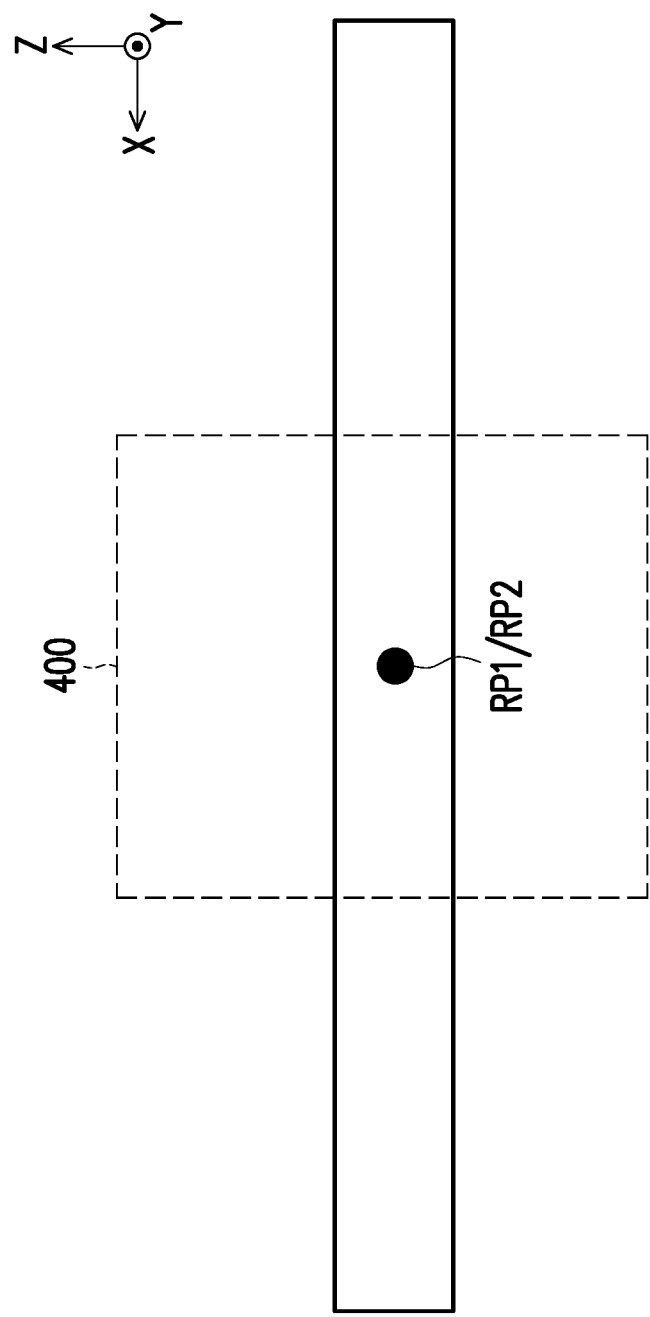
FIG. 5 is a schematic diagram of generating second volume data according to an embodiment of the disclosure.

In Step S230, the processor 110 may convert the multiple first coordinates of the multiple voxels of the first volume data to the display device coordinate system to generate second volume data. With reference to FIG. 3 to FIG. 5, FIG. 5 is a schematic diagram of generating the second volume data according to an embodiment of the disclosure. In this embodiment, the processor 110 may align the coordinates of the reference point RP2 of the first volume data 400 with the reference point RP1 in the display device coordinate system, so as to convert the multiple first coordinates of the multiple voxels of the first volume data 400 to the display device coordinate system to generate the second volume data. In this embodiment, image data of each piece of voxel data of the second volume data is the same as image data corresponding to each piece of the voxel data of the first volume data (that is, the content of the image data is not modified), and the absolute spacings between respective voxels are also unchanged, but new coordinates are recorded. In other words, the processor 110 may reconstruct 3D data of the first volume data 400 according to a viewing angle of the currently viewed medical image content, so as to write coordinates of each voxel in the display device coordinate system to generate the second volume data.

In Step S240, the processor 110 may generate display data according to the second volume data. In Step S250, the processor 110 may display an image according to the display data through the display device 100, and the image may form a 3D image with the 3D object image in human eyes. In this embodiment, since each voxel of the second volume data has the absolute spacing (that is, a relative distance between each voxel is a real distance, which does not change unless the operator controls the image to scale up or scale down), and may construct the 3D object image corresponding to the size of a real object, so no matter what the image resolution or panel size of the display panel 130 of the disclosure is, the corresponding image may be displayed according to the display data generated by the second volume data, and the image may form a 3D image with the 3D object image corresponding to the size of the real object in human eyes. In addition, the 3D object image changes equally or proportionally in response to a change desired by the user through the input unit 140. In this regard, changing equally or proportionally in response to the change desired by the user through the input unit 140 means that the input unit 140 may generate a corresponding control command or adjustment parameter according to an operation of the user, so that the processor 110 may obtain real physical adjustment information to adjust volume data. The real physical adjustment information is, for example, a real moving distance, a rotation angle, and/or a scaling proportion. That is, for example, if the user desires to move the 3D object image to the left by 2 cm, the second volume data or the 3D object image actually viewed by the user is also moved to the left by 2 cm. The effects of rotation and scaling may be analogized.

Figure 6:
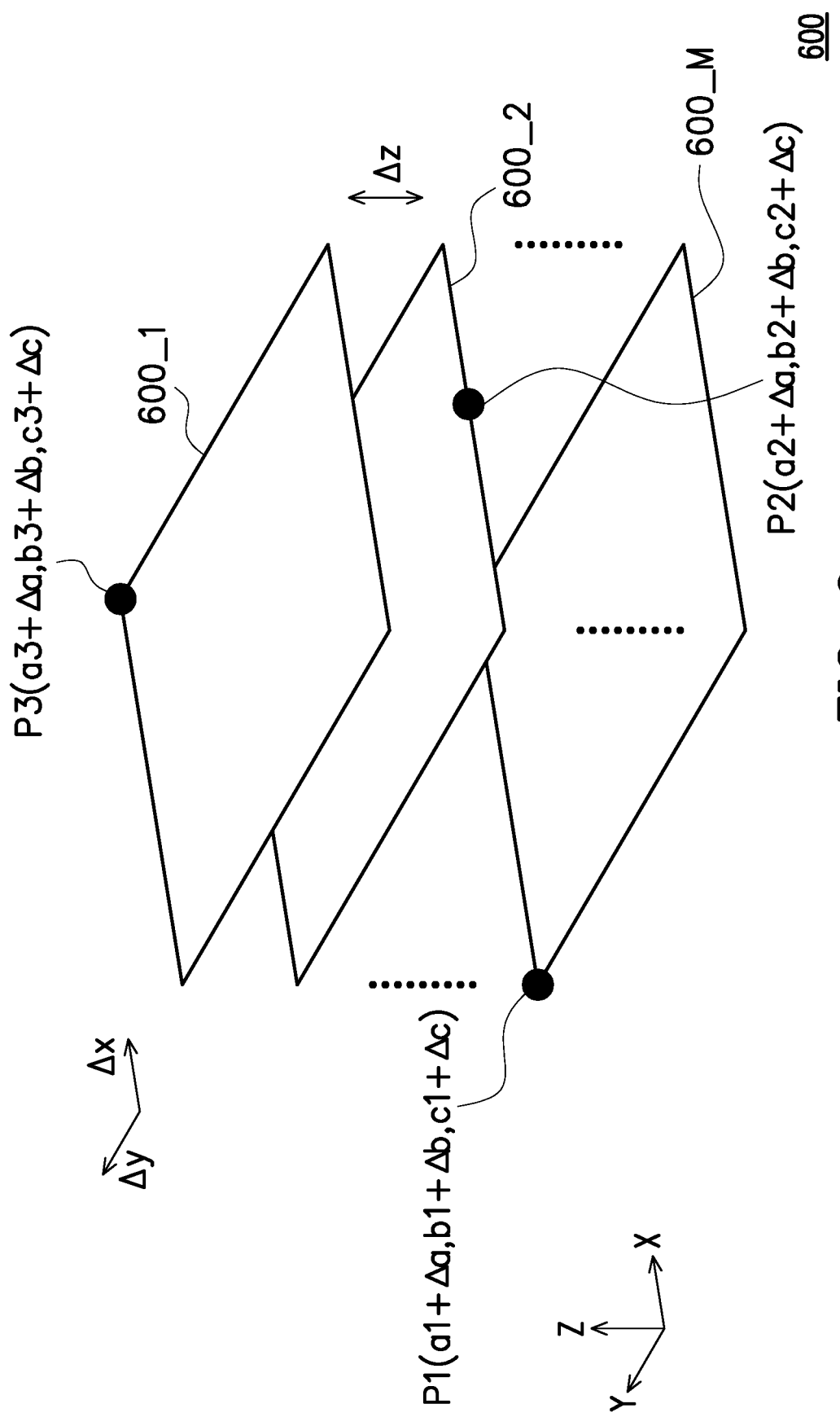
FIG. 6 is a schematic diagram of moving volume data according to an embodiment of the disclosure.

FIG. 6 is a schematic diagram of moving volume data according to an embodiment of the disclosure. Referring to FIG. 1 and FIG. 6, in this embodiment, the processor 110 may move multiple second coordinates of multiple voxels of second volume data 600 according to a movement distance and an orientation desired by the user through the input unit 140, so that the 3D object image formed in the human eyes correspondingly moves at an equal distance. As shown in FIG. 6, the second volume data 600 includes multiple layers of two-dimensional image data 600_1 to 600_M. For example, the user operates an operation interface displayed on the display panel 130 through the input unit 140 to input a movement orientation and distance ($\Delta a$, $\Delta b$, $\Delta c$). For this, a voxel P1 may move from coordinates (a1, b1, c1) to coordinates (a1+$\Delta a$, b1+$\Delta b$, c1+$\Delta c$). A voxel P2 may move from coordinates (a2, b2, c2) to coordinates (a2+$\Delta a$, b2+$\Delta b$, c2+$\Delta c$). A voxel P3 may move from coordinates (a3, b3, c3) to coordinates (a3+$\Delta a$, b3+$\Delta b$, c3+$\Delta c$). a1 to a3, b1 to b3, c1 to c3, $\Delta a$, $\Delta b$, and $\Delta c$ are coordinate values. By analogy, the second volume data 600 may correspondingly move at an equal distance according to an actual movement distance desired by the user. In this way, the processor 110 may generate the display data according to the moved second volume data 600 for the display panel 130 to display, so that the 3D object image formed in the human eyes correspondingly moves at an equal distance. It should be noted that the way to move the second volume data 600 may be realized by changing an origin position of the display device coordinate system, the reference point, or changing coordinates of the reference point of the second volume data 600.

FIG. 7A and FIG. 7B are schematic diagrams of rotating volume data according to an embodiment of the disclosure. Referring to FIG. 1, FIG. 7A, and FIG. 7B, in this embodiment, the processor 110 may rotate positions of multiple voxels of second volume data 700 according to a rotation angle desired by the user through the input unit 140, so that the 3D object image correspondingly rotates at an equal angle. Referring first to FIG. 7A, for example, the user operates the operation interface displayed on the display panel 130 through the input unit 140 to perform a rotation operation as shown in FIG. 7A. Through the input unit 140, the user sets, controls, or defines a point 701 as a starting point of the rotation and moves to a point 702 as an end point of the rotation. The processor 110 may calculate an included angle between shortest connecting lines between the point 701 and the point 702, respectively, and a rotation axis RA based on the preset rotation axis RA to obtain a rotation angle θ. Next, referring to FIG. 7B, the second volume data 700 includes multiple layers of two-dimensional image data 700_1 to 700_M. The processor 110 rotates a position of each voxel of the second volume data in the display device coordinate system according to the rotation angle θ, the second volume data in the display device coordinate system, and a preset rotation axis RB (which may be preset by the system or set by the user). The rotation axis RA may or may not be equal to the rotation axis RB. For this, a voxel P1' may be rotated from coordinates (a1, b1, c1) to coordinates (a1', b1', c1'). A voxel P2' may be rotated from coordinates (a2, b2, c2) to coordinates (a2', b2', c2'). A voxel P3' may be rotated from coordinates (a3, b3, c3) to coordinates (a3', b3', c3'). a1' to a3', b1' to b3', and c1' to c3' are coordinate values. By analogy, the second volume data 700 may correspondingly rotate at an equal angle according to an actual rotation angle desired by the user. In this way, the processor 110 may generate the display data according to the rotated second volume data 700 for the display panel 130 to display, so that the 3D object image formed in the human eyes correspondingly rotates at an equal angle.

Figure 8:
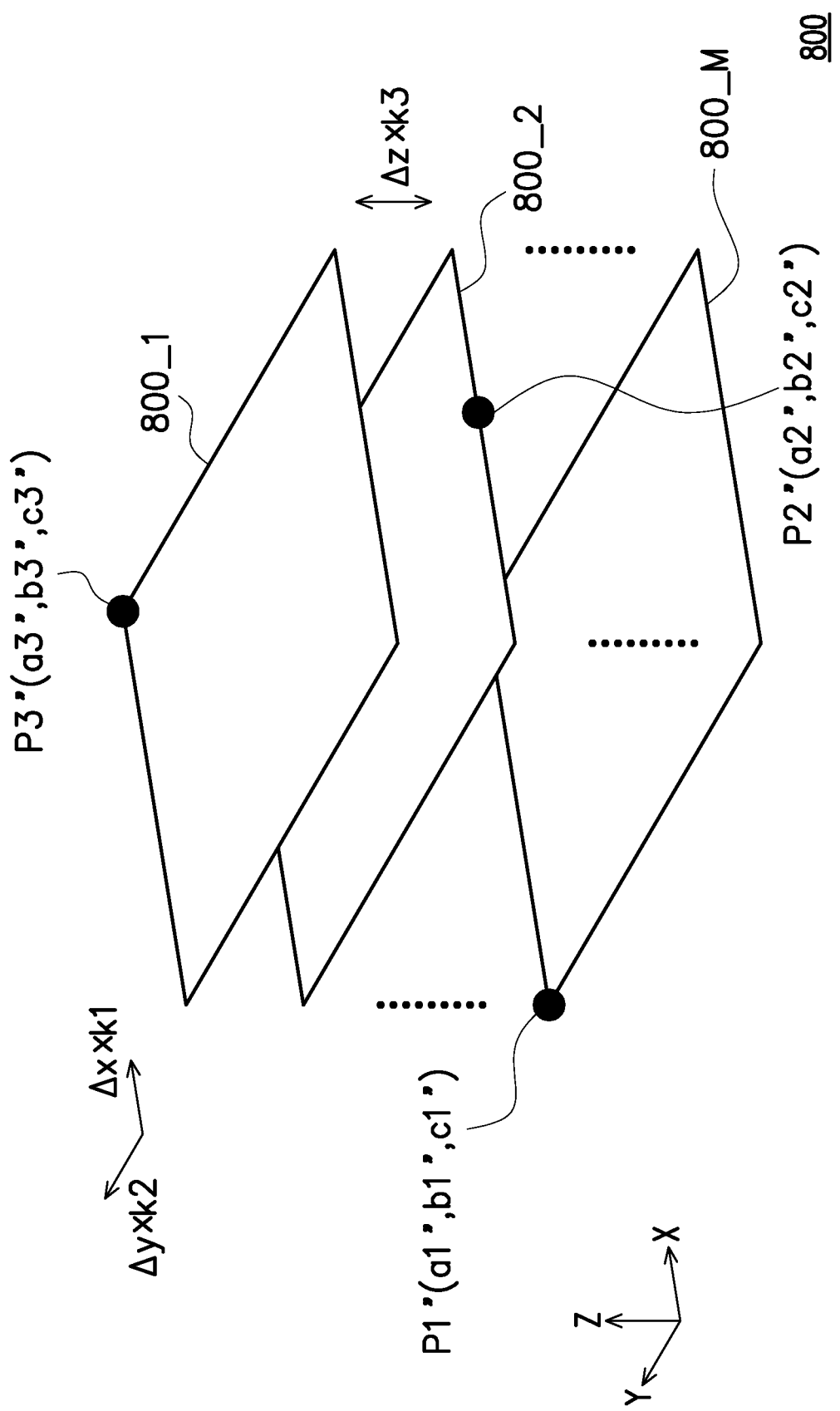
FIG. 8 is a schematic diagram of scaling volume data according to an embodiment of the disclosure.

FIG. 8 is a schematic diagram of scaling volume data according to an embodiment of the disclosure. Referring to FIG. 1 and FIG. 8, in this embodiment, the processor 110 may equally or proportionally scale the absolute spacing between multiple voxels of second volume data 800 (or the first volume data) according to a scaling proportion desired by the user through the input unit 140, so that the 3D object image correspondingly scales equally or proportionally. As shown in FIG. 8, the second volume data 800 includes multiple layers of two-dimensional image data 800_1 to 800_M. For example, the user operates the operation interface displayed on the display panel 130 through the input unit 140 to input desired scaling proportion information. The proportion information includes, for example, a scaling proportion k1 corresponding to the first orientation X, a scaling proportion k2 corresponding to the second orientation Y, and a scaling proportion k3 corresponding to the third orientation Z. The scaling proportions k1 to k3 may be the same proportion or different proportions. For this, a first absolute spacing Δx, a second absolute spacing Δy, and a third absolute spacing Δz between respective voxels may be changed to a first absolute spacing Δx×k1, a second absolute spacing Δy×k2, and a third absolute spacing Δz×k3. Therefore, coordinates (a1, b1, c1) of a voxel P1" may be changed to (a1", b1", c1"). Coordinates (a2, b2, c2) of a voxel P2" may be changed to (a2", b2", c2"). Coordinates (a3, b3, c3) of a voxel P3" may be changed to (a3", b3", c3"). a1" to a3", b1" to b3", and c1" to c3" are coordinate values. By analogy, volume formed by the second volume data 800 in the display coordinate system may correspondingly scale equally or proportionally according to an actual scaling proportion desired by the user. In this way, the processor 110 may generate the display data according to the equally or proportionally scaled second volume data 800 for the display panel 130 to display, so that the 3D object image formed in the human eyes correspondingly scales equally or proportionally. In addition, in an embodiment, the processor 110 may also scale the first volume data equally or proportionally in a manner similar to the above firstly, and then convert the equally or proportionally scaled first volume data after to the second volume data, and a scaling effect of the 3D object image may also be realized identically.

Figure 9:
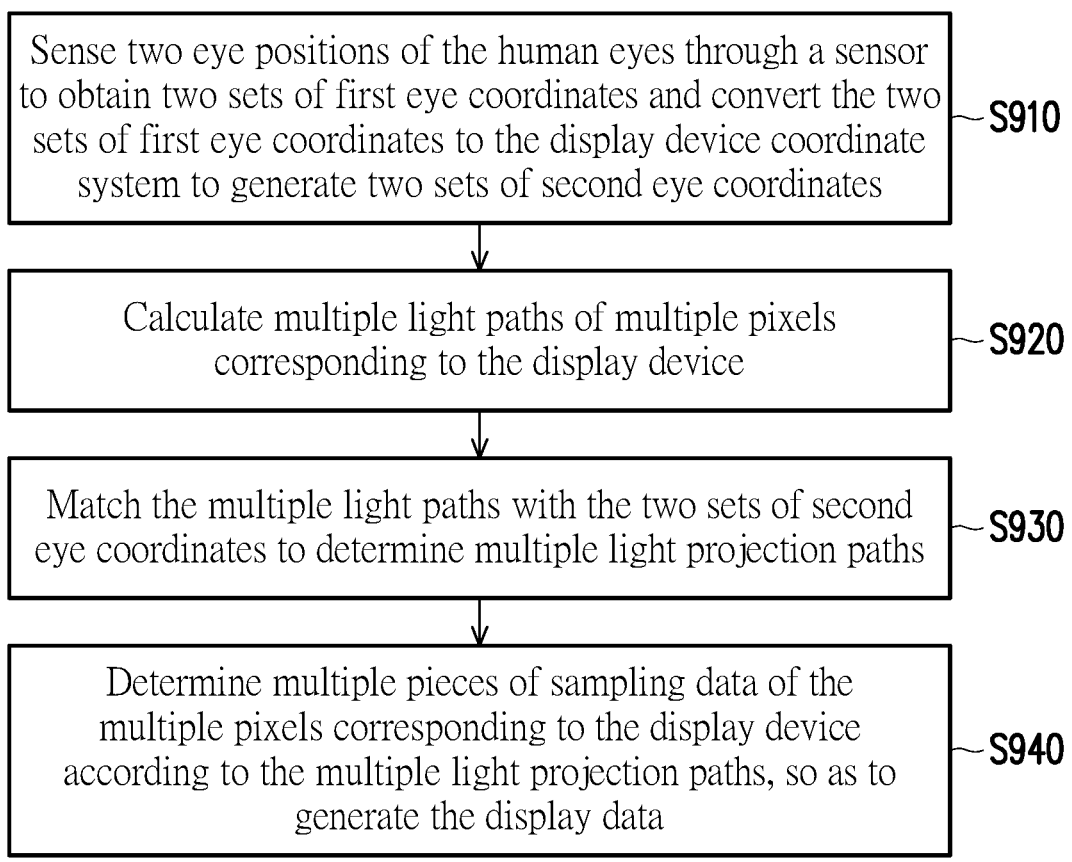
FIG. 9 is a flowchart of generating display data according to an embodiment of the disclosure.

FIG. 9 is a flowchart of generating the display data according to an embodiment of the disclosure. Referring to FIG. 1 and FIG. 9, the display device 100 may operate the following Step S910 to Step S940 to generate the display data. The following embodiments of FIG. 9 to FIG. 13B are used to illustrate the specific implementation means of Step S240 and Step S250 of the above-mentioned embodiment in FIG. 2. In Step S910, the processor 110 may sense two eye positions of the human eyes through a sensor to obtain two sets of first eye coordinates, and convert the two sets of first eye coordinates to the display device coordinate system to generate two sets of second eye coordinates. In this embodiment, the processor 110 may sense two eye positions of a viewer through the sensor, so as to obtain the two sets of first eye coordinates corresponding to respective center positions of pupils of the two eyes.

It should be noted firstly that the display device 100 may further include a sensor, and the sensor is coupled to the processor 110. The sensor, for example, may be disposed at any position in the peripheral area 232 of the display panel 130 as shown in FIG. 3 to sense positions of the human eyes of the user viewing the display device 100, but the disclosure is not limited thereto. In an embodiment, the sensor may also be disposed in the middle of the AA 231 of the display panel 130 or other positions. In this embodiment, the sensor may be an eye tracker, an image sensor, or an infrared sensor (IR sensor), etc., and is used to track the positions of the human eyes. The sensor may directly transmit corresponding coordinate information to the processor 110, or provide a visible light image or an infrared image to the processor 110, so that the processor 110 may analyze the visible light image or the infrared image to obtain the corresponding coordinate information.

Figure 10:
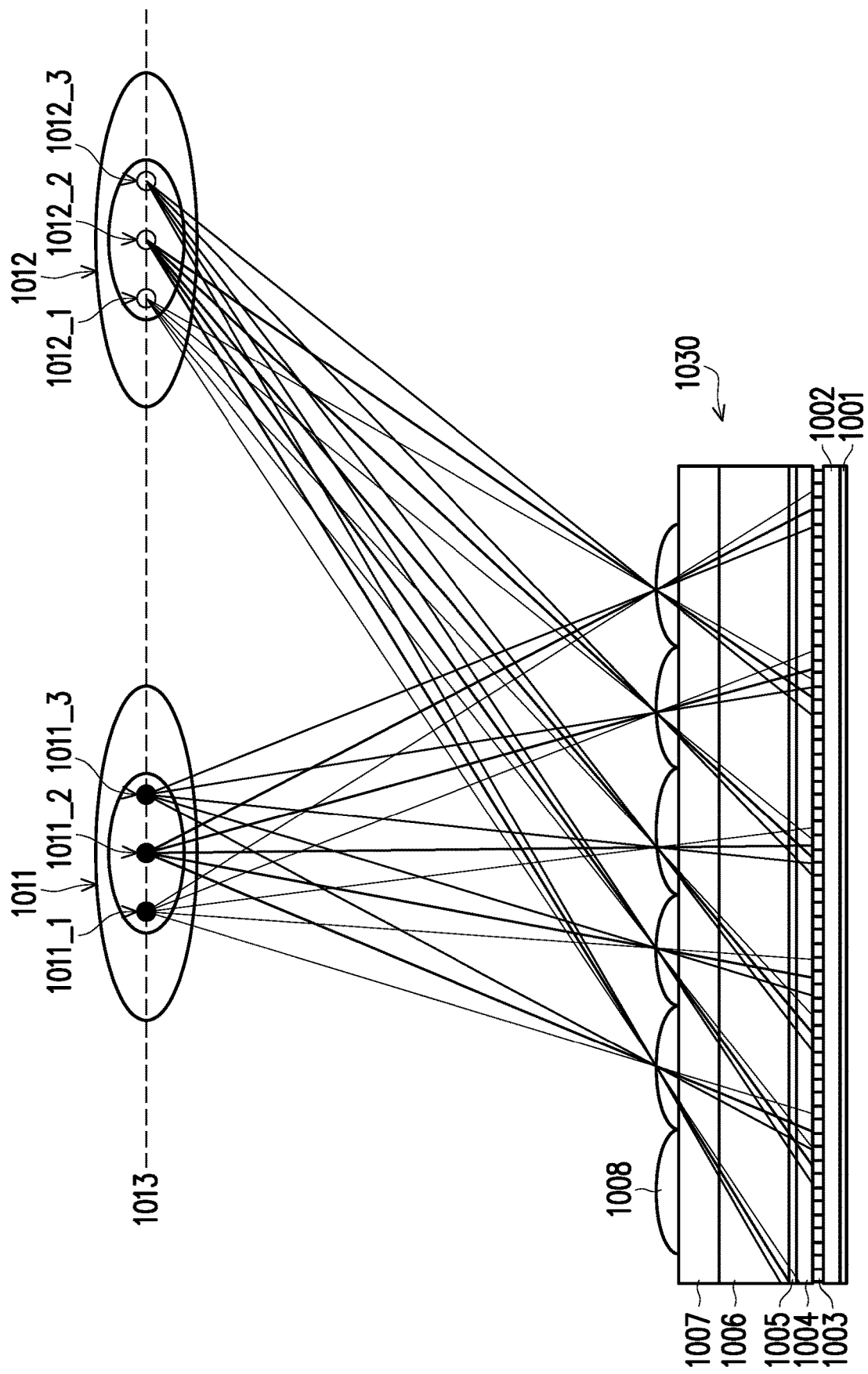
FIG. 10 is a schematic diagram of a positional relationship between eyes and a display device according to an embodiment of the disclosure.

Referring to FIG. 10, FIG. 10 is a schematic diagram of a positional relationship between eyes and a display device according to an embodiment of the disclosure. It should be noted that FIG. 10 only shows a schematic side view diagram of the display device 100, and the sensed positional relationship between the position of two eyes of the viewer and the display device in the actual 3D space may be analogized. In this embodiment, the sensor may sense positions of an eye 1011 and an eye 1012 of the viewer (the human eyes), and return the two sets of first eye coordinates of the eye 1011 and the eye 1012 to the processor 110, in which the two sets of first eye coordinates are generated based on a sensor coordinate system. In an embodiment, the sensor may also sense a middle position between the eye 1011 and the eye 1012 of the viewer, and further calculate the two sets of first eye coordinates of the eyes 1011 and the eye 1012 according to a preset interpupillary distance. In this embodiment, the processor 110 may perform corresponding coordinate conversion calculations to convert the two sets of first eye coordinates from the sensor coordinate system to the display device coordinate system to generate two sets of second eye coordinates in the display device coordinate system.

In Step S920, the processor 110 may calculate multiple light paths of multiple pixels corresponding to the display device 100. With reference to FIG. 10, in this embodiment, the display panel 130 of the display device 100 may have a panel structure of a display panel 1030 as shown in FIG. 10. The display panel 1030 may include an upper polarizing plate 1001, a lower polarizing plate 1005, an upper lower glass substrate 1002, a lower glass substrate 1004, a display layer 1003, a sticking layer 1006, a lens substrate 1007, and a lens 1008 (light splitting structure). The display layer 1003 may include multiple pixels arranged in an array. In this embodiment, the processor 110 may firstly calculate a light path of each pixel in the display layer 1003 passing through the lens 1008. In an embodiment, the multiple light paths may also correspond to multiple sub-pixels of the multiple pixels of the display layer 1003.

In Step S930, the processor 110 may match the multiple light paths with the two sets of second eye coordinates to determine multiple light projection paths. With reference to FIG. 10, in this embodiment, the processor 110 may firstly define an eye viewing point 1011_2 and an eye viewing point 1012_2 respectively corresponding to the two sets of second eye coordinates of respective pupil centers of the two eyes. Next, the processor 110 may align multiple pixels of the display layer 1003 to the eye viewing point 1011_2 and the eye viewing point 10122 of the two sets of second eye coordinates respectively, so as to determine multiple light projection paths, so that at least a part of the pixels of the display layer 1003 may emit images to the eye viewing point 1011_2 and the eye viewing point 1012_2 respectively along the light projection paths. However, in an embodiment, the processor 110 may define multiple eye viewing points 1011_1 to 1011_3 and 1012_1 to 1012_3 respectively corresponding to the two sets of second eye coordinates along a reference line 1013. Next, the processor 110 may align multiple pixels of the display layer 1003 to the eye viewing points 1011_1 to 1011_3 and 1012_1 to 1012_3 of the two sets of second eye coordinates respectively, so as to determine multiple light projection paths, so that at least a part of the pixels of the display layer 1003 may emit images to the eye viewing points 1011_1 to 1011_3 and 1012_1 to 1012_3 respectively along the light projection paths. The eye viewing points 1011_1 to 1011_3 and 1012_1 to 1012_3 may be respectively positioned within corresponding pupil ranges, but the disclosure is not limited thereto. In some embodiments, the reference line 1013 may be a connecting line extension between two points or may comprise a vector between two points, but is not limited thereto. For example, the reference line 1013 may be a connecting line of the pupil centers of two eyes of the viewer and may also be, for example, a vector of a starting point and an end point set by a system.

Figure 11:
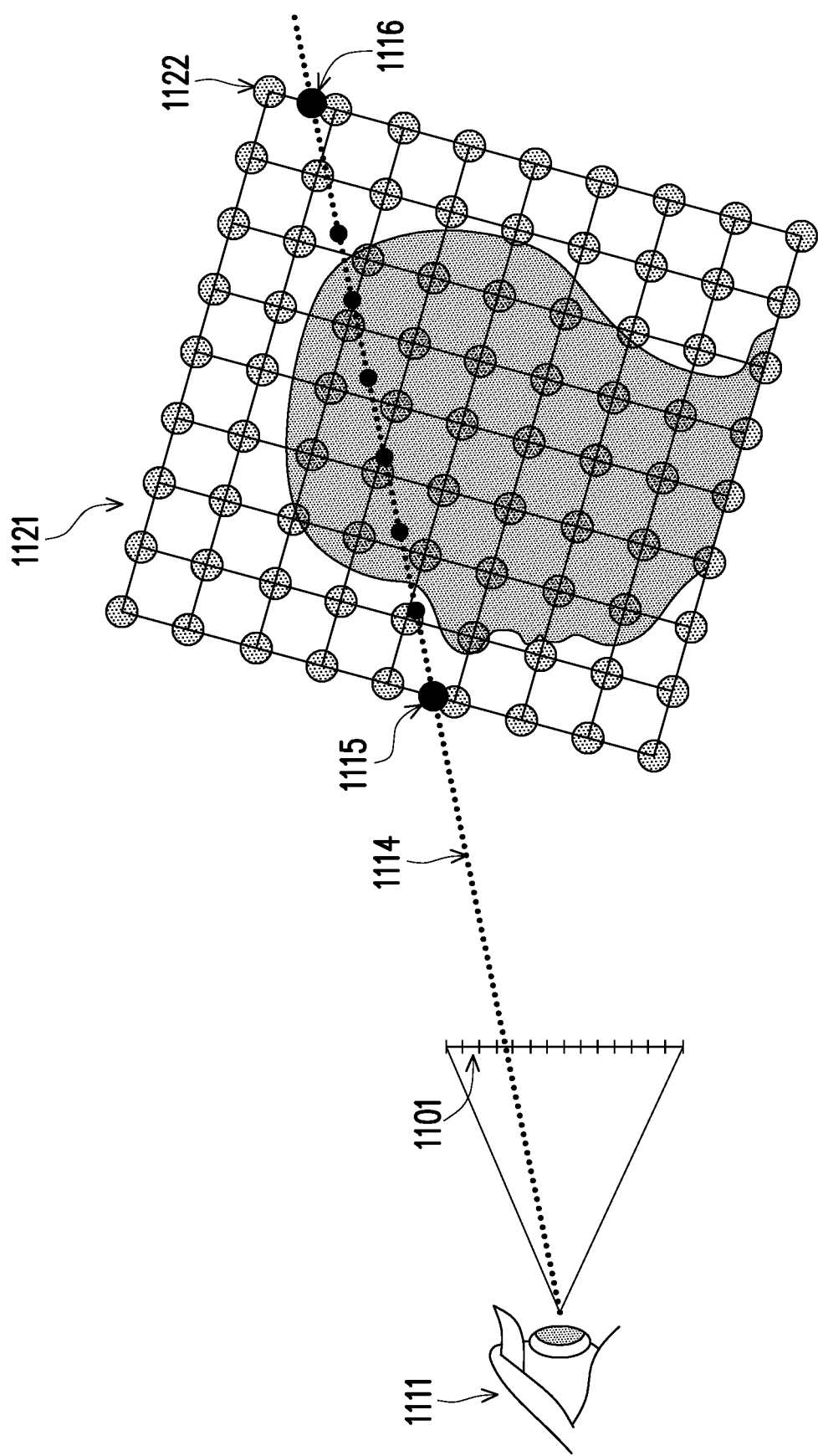
FIG. 11 is a schematic diagram of volume data according to an embodiment of the disclosure.

In Step S940, the processor 110 may determine multiple pieces of sampling data corresponding to multiple pixels according to the second volume data and multiple light projection paths, so as to generate the display data. With reference to FIG. 11, FIG. 11 is a schematic diagram of volume data according to an embodiment of the disclosure. In this embodiment, the processor 110 may simulate a positional relationship among a 3D image 1121, a display plane 1101 of the display panel, and an eye 1111 of the viewer according to the coordinate parameters in the second volume data corresponding to the display device coordinate system. The 3D image 1121 is used to represent a construction result of multiple pieces of display data of multiple voxels of the second volume data (for example, the second volume data after being moved, rotated and/or scaled in the aforementioned embodiments). It should be noted that FIG. 11 only represents a schematic side view diagram of the positional relationship among the 3D image 1121, the display plane 1101 of the display panel, and the eye 1111 of the viewer, and a positional relationship between the sensed position of the two eyes of the viewer and the display device 100 may be analogized. The processor 110 may separately calculate multiple numerical values corresponding to multiple voxels 1122 passed by each light projection path of the 3D image 1121 of the second volume data, so as to generate multiple pieces of synthetic data corresponding to the multiple pixels, and convert the multiple pieces of synthetic data to the display data. As shown in FIG. 11, a light projection path 1114 is taken as an example. The processor 110 may determine a position where the light projection path 1114 passes through the 3D image 1121, and sample multiple values corresponding to voxels passed between a starting position 1115 and an end position 1116 of the 3D image 1121 on the light projection path 1114, in which the multiple values may be, for example, the radiation absorption value, the wave signal, or a magnetic resonance signal, but the disclosure is not limited thereto.

Figure 12:
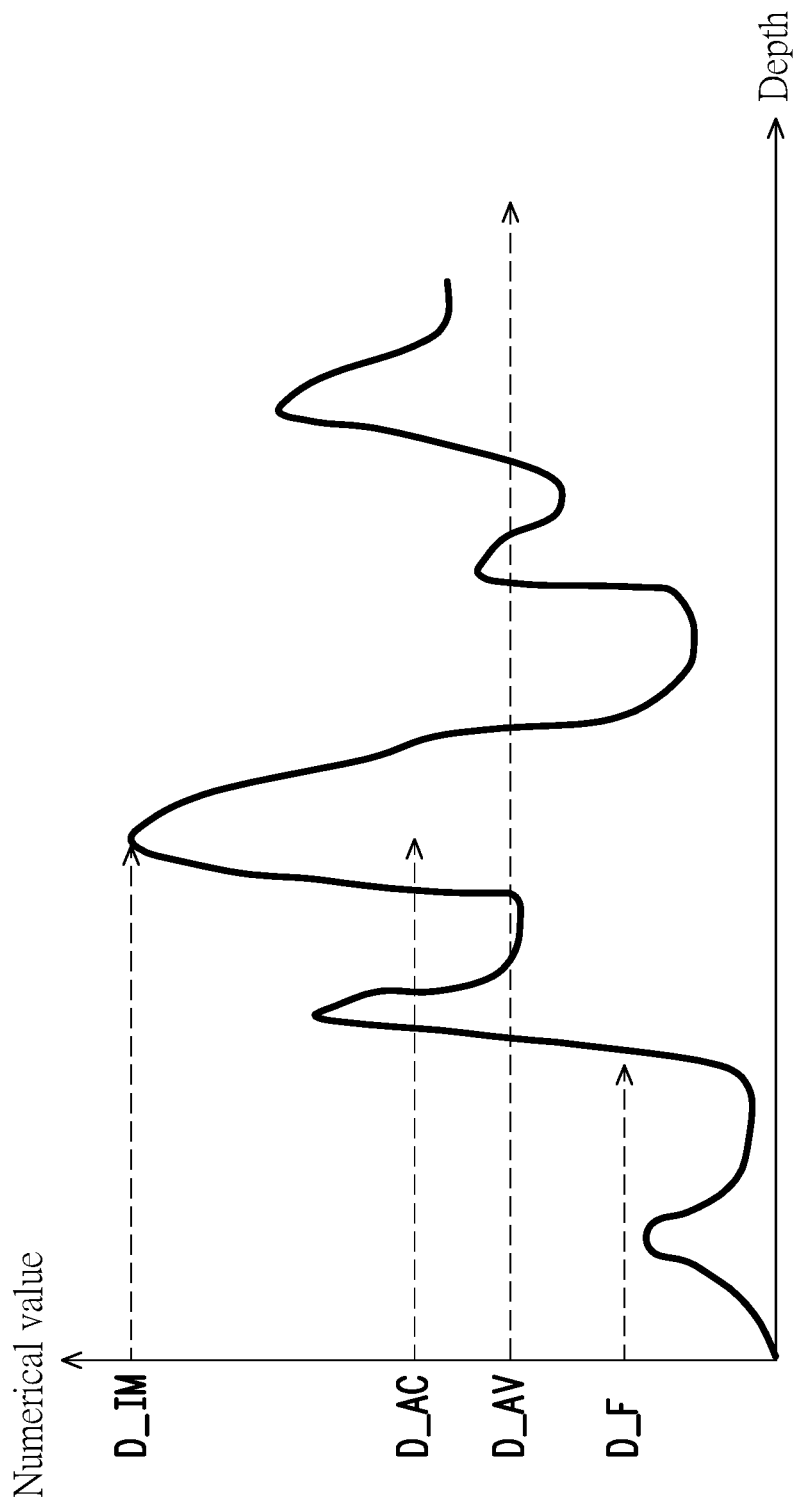
FIG. 12 is a schematic diagram of data changes of sampling data according to an embodiment of the disclosure.

With reference to FIG. 12, FIG. 12 is a schematic diagram of data changes of sampled data according to an embodiment of the disclosure. The values corresponding to the voxels passed between the starting position 1115 and the end position 1116 of the 3D image 1121 on the light projection path 1114 may vary with depth and, for example, have a value change as shown in FIG. 12. In this regard, the processor 110 may use a first value D_F, an average value D_AV, an accumulative value D_AC, or a maximum value D_IM of the values at a preset depth as sampling data of corresponding pixels, and as the display data corresponding to the pixels. It should be noted that the "depth" here is not limited to a single axis (for example: the Z orientation), and the "depth" may be, for example, a vector passing through a voxel and the starting position 1115 on a light projection path, but is not limited thereto.

Figure 13B:
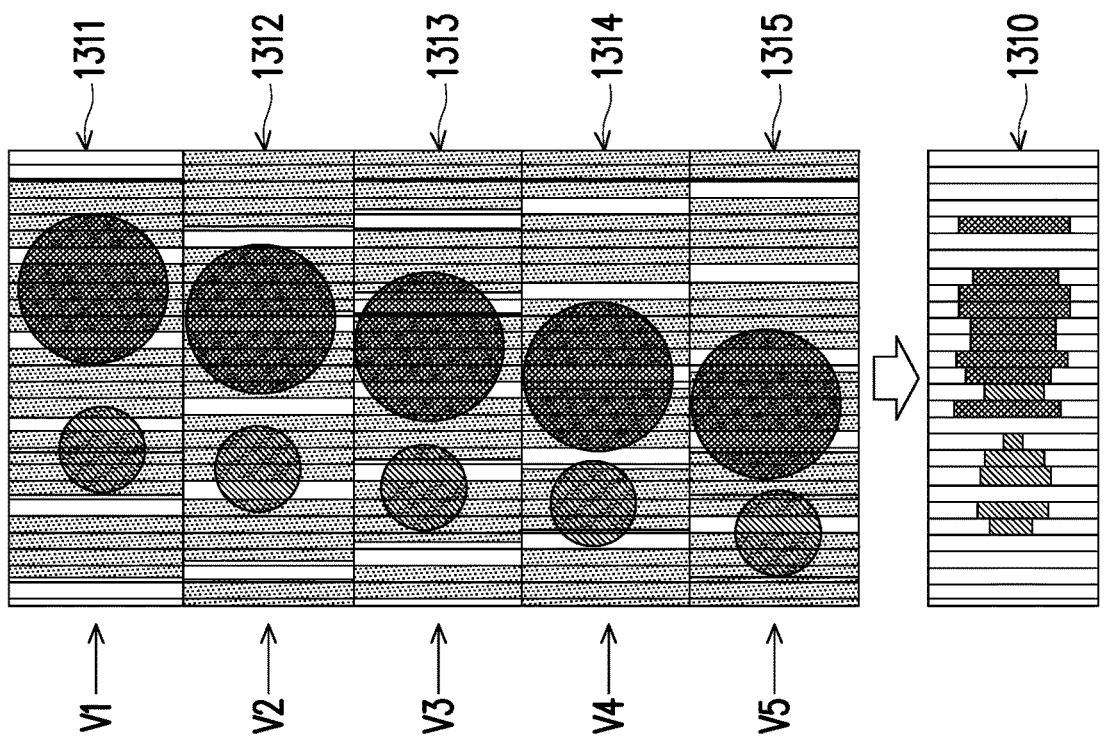
FIG. 13A and FIG. 13B are schematic diagrams of an actual display frame displayed by a display device according to an embodiment of the disclosure.
Figure 13A:
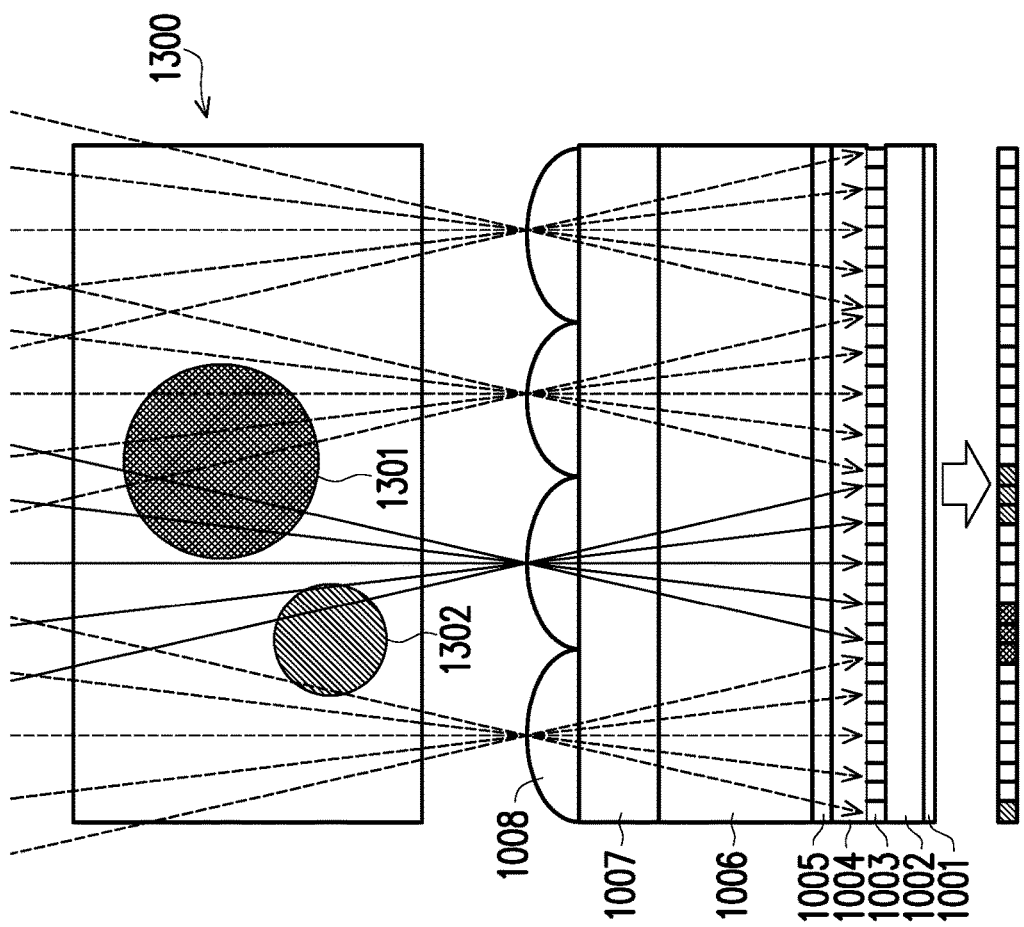

With reference to FIG. 13A and FIG. 13B, FIG. 13A and FIG. 13B are schematic diagrams of an actual display frame displayed by a display device according to an embodiment of the disclosure. Referring to FIG. 1 and FIG. 13A, the processor 110 may combine the synthetic data of each light projection path to generate an actual display screen 1310 (a result of an actual 3D image displaying on a flat display screen). For example, as shown in FIG. 13A, it may be known from multiple light projection paths between the 3D image 1300 and the display panel 1030 that a 3D object image 1301 and a 3D object image 1302 of the 3D image 1300 may, for example, be displayed respectively at different corresponding positions on the actual display screen 1310. Referring to FIG. 1 and FIG. 13B, it is taken as an example that a micro lens may pass through light projection paths of 5 different viewing angles. A display result of multiple pixels of a first viewing angle V1 of each micro lens of the display panel 1030 may be the same as a display result of a sub-image 1311. By analogy, display results of multiple pixels from a second to a fifth viewing angle V2 to V5 of each micro lens of the display panel 1030 may be the same as display results of sub-images 1312 to 1315. In this way, after the sub-images 1311 to 1315 are superimposed, the display panel 1030 may display a result of the actual display screen 1310 as shown in FIG. 13B. Therefore, the viewer may view the 3D display image with the 3D object image 1301 and the 3D object image 1302 through the actual display screen 1310 displayed on the display panel 1330. That is to say, the two-dimensional actual display screen 1310 may form a 3D image with the 3D object image 1301 and the 3D object image 1302 in the human eyes.

In summary, the 3D image display method and the display device with the 3D image display function of the disclosure may define the spacings between respective voxels in the volume data to be equal to the actual distance or proportional to the actual distance, so that no matter what the image resolution or panel size of the display panel is, the corresponding image may be displayed according to the display data generated by the volume data, and the image may form the 3D image with the 3D object image corresponding to the size of the real object in the human eyes. In addition, the 3D object image may further change equally or proportionally in response to the change desired by the user through the input unit.

Finally, it should be noted that: the above embodiments are only used to illustrate the technical solutions of the disclosure, rather than to limit them; although the disclosure has been described in detail with reference to the foregoing embodiments, persons skilled in the art should understand that the technical solutions described in the foregoing embodiments may be modified or equivalent replacements for some or all of the technical features may be performed. However, the modifications or replacements do not make the essence of the corresponding technical solutions depart from the scope of the technical solutions of the embodiments of the disclosure.

What is claimed is:

1. A three-dimensional (3D) image display method, comprising:
   establishing, by a processor, a display device coordinate system;
   obtaining, by the processor, first volume data and defining a plurality of first coordinates of a plurality of voxels of the first volume data in an absolute space coordinate system;
   aligning, by the processor, coordinates of a reference point of the first volume data with a reference point in the display device coordinate system, to convert the plurality of first coordinates of the plurality of voxels of the first volume data to the display device coordinate system to generate second volume data;
   generating, by the processor, a display data according to the second volume data; and
   displaying an image according to the display data through a display device, and the image is viewed by human eyes as a 3D object image, wherein the 3D object image changes equally or proportionally in response to a change desired by a user through an input unit.

2. The 3D image display method according to claim 1, wherein defining the plurality of first coordinates comprises:
determining the plurality of first coordinates of the plurality of voxels in the absolute space coordinate system according to a first absolute spacing of a first orientation, a second absolute spacing of a second orientation, and a third absolute spacing of a third orientation corresponding to the absolute space coordinate system.

3. The 3D image display method according to claim 1, further comprising:
moving a plurality of second coordinates of a plurality of voxels of the second volume data according to a movement distance and an orientation desired by the user through the input unit, so that the 3D object image correspondingly moves at an equal distance.

4. The 3D image display method according to claim 1, further comprising:
rotating positions of the plurality of voxels of the second volume data according to a rotation angle desired by the user through the input unit, so that the 3D object image correspondingly rotates at an equal angle.

5. The 3D image display method according to claim 1, further comprising:
scaling equally or proportionally an absolute spacing between the plurality of voxels of the first volume data or the second volume data according to a scaling proportion desired by the user through the input unit, so that the 3D object image correspondingly scales equally or proportionally.

6. The 3D image display method according to claim 1, wherein generating the display data according to the second volume data comprises:
determining a plurality of pieces of sampling data of a plurality of pixels corresponding to the display device according to a plurality of light projection paths, so as to generate the display data.

7. The 3D image display method according to claim 6, wherein generating the display data according to the second volume data further comprises:
sensing two eye positions of the human eyes through a sensor to obtain two sets of first eye coordinates, and converting the two sets of first eye coordinates to the display device coordinate system to generate two sets of second eye coordinates;
calculating a plurality of light paths of the plurality of pixels corresponding to the display device; and
matching the plurality of light paths with the two sets of second eye coordinates to determine the plurality of light projection paths.

8. The 3D image display method according to claim 7, wherein generating the display data comprises:
calculating a plurality of values corresponding to a plurality of voxels passed by each of the plurality of light projection paths of the second volume data, so as to generate a plurality of pieces of synthetic data corresponding to the plurality of pixels; and
converting the plurality of pieces of synthetic data to the display data.

9. The 3D image display method according to claim 1, wherein the first volume data comprises a plurality of layers of two-dimensional medical images.

10. A display device with a 3D image display function, comprising:
a processor configured to establish a display device coordinate system; and
an input unit coupled to the processor,
the processor obtains first volume data and defines a plurality of first coordinates of a plurality of voxels of the first volume data in an absolute space coordinate system,
the processor converts the plurality of first coordinates of the plurality of voxels of the first volume data to the display device coordinate system to generate second volume data,
the processor generates display data according to the second volume data,
the display device displays an image according to the display data, and the image is viewed by human eyes as a 3D object image,
wherein the 3D object image changes equally or proportionally in response to a change desired by a user through an input unit, and
wherein the processor aligns coordinates of a reference point of the first volume data with a reference point in the display device coordinate system, so as to convert the plurality of first coordinates of the plurality of voxels of the first volume data to the display device coordinate system.

11. The display device according to claim 10, wherein the processor determines the plurality of first coordinates of the plurality of voxels in the absolute space coordinate system according to a first absolute spacing of a first orientation, a second absolute spacing of a second orientation, and a third absolute spacing of a third orientation corresponding to the absolute space coordinate system.

12. The display device according to claim 10, wherein the processor moves a plurality of second coordinates of a plurality of voxels of the second volume data according to a movement distance and an orientation desired by the user through the input unit, so that the 3D object image correspondingly moves at an equal distance.

13. The display device according to claim 10, wherein the processor rotates positions of the plurality of voxels of the second volume data according to a rotation angle desired by the user through the input unit, so that the 3D object image correspondingly rotates at an equal angle.

14. The display device according to claim 10, wherein the processor scales equally or proportionally an absolute spacing between the plurality of voxels of the first volume data or the second volume data according to a scaling proportion desired by the user through the input unit, so that the 3D object image correspondingly scales equally or proportionally.

15. The display device according to claim 10, wherein the processor determines a plurality of pieces of sampling data of a plurality of pixels corresponding to the display device according to a plurality of light projection paths, so as to generate the display data.

16. The display device according to claim 15, further comprising:
a sensor coupled to the processor and configured to sense two eye positions of the human eyes to obtain two sets of first eye coordinates,
the processor converts the two sets of first eye coordinates to the display device coordinate system to generate two sets of second eye coordinates and calculates a plurality of light paths of the plurality of pixels corresponding to the display device, the processor matches the plurality of light paths with the two sets of second eye coordinates to determine the plurality of light projection paths.

17. The display device according to claim 16, wherein the processor calculates a plurality of numerical values corresponding to a plurality of voxels passed by each of the plurality of light projection paths of the second volume data, so as to generate a plurality of pieces of synthetic data corresponding to the plurality of pixels, the processor converts the plurality of pieces of synthetic data to the display data.

18. The display device according to claim 10, wherein the first volume data comprises a plurality of layers of two-dimensional medical images.

* * * * *